(12) United States Patent
Kissel, Jr.

(10) Patent No.: US 8,950,540 B2
(45) Date of Patent: Feb. 10, 2015

(54) ENVIRONMENT ADAPTIVE ELECTRIC VEHICLE WITH LOCK ON SECURITY AND CONTROL SADDLE

(71) Applicant: Waldemar F. Kissel, Jr., Gainesville, FL (US)

(72) Inventor: Waldemar F. Kissel, Jr., Gainesville, FL (US)

(73) Assignee: WFK & Associates, LLC, Gainesville, FL (US)

( * ) Notice: Subject to any disclaimer, the term of this patent is extended or adjusted under 35 U.S.C. 154(b) by 0 days.

(21) Appl. No.: 13/649,621

(22) Filed: Oct. 11, 2012

(65) Prior Publication Data

US 2013/0153324 A1 Jun. 20, 2013

Related U.S. Application Data

(60) Provisional application No. 61/546,144, filed on Oct. 12, 2011.

(51) Int. Cl.
| | |
|---|---|
| *B60K 28/10* | (2006.01) |
| *B62D 21/15* | (2006.01) |
| *B60K 7/00* | (2006.01) |
| *B61B 13/00* | (2006.01) |

(52) U.S. Cl.
CPC ............ *B62D 21/152* (2013.01); *B60K 7/0007* (2013.01); *B61B 13/00* (2013.01)
USPC ......................................... 180/274

(58) Field of Classification Search
USPC ...................... 180/65.1, 65.51, 274
See application file for complete search history.

(56) References Cited

U.S. PATENT DOCUMENTS

| | | | | |
|---|---|---|---|---|
| 5,004,061 | A | * | 4/1991 | Andruet ..................... 180/65.51 |
| 5,251,680 | A | * | 10/1993 | Minezawa et al. ............ 180/169 |
| 5,921,338 | A | * | 7/1999 | Edmondson ............... 180/65.51 |
| 2010/0307844 | A1 | * | 12/2010 | Peters ............................ 180/60 |

* cited by examiner

*Primary Examiner* — Faye M Fleming
*Assistant Examiner* — Robert A Coker
(74) *Attorney, Agent, or Firm* — GrayRobinson, P.A.; Michael J. Colitz, III

(57) ABSTRACT

The Environment Adaptive Electric Vehicle (EAEV) is capable of operating in a number of operating environments such as on a conventional highway, or on an elevated mainstream transportation infrastructure and also on a variety of local, low velocity, low volume, automated and semi-automated transportation infrastructures that may serve as collector roads for vehicles to access the mainstream elevated integrated bimodal infrastructures. The EAEV has a variety of sensors, receivers, cameras, monitoring devices, magnetic readers, GPS built into the vehicle. In a typical vehicle all of this information would be interpreted and applied in the same way. In the EAEV the vehicle wants to know what environment it is in. It then uses the software that defines that environment for all of its decisions. As a result, the EAEV uses the same equipment and similar information that is received over the equipment but applies it differently depending on what kind of system the vehicle is travelling on.

16 Claims, 6 Drawing Sheets

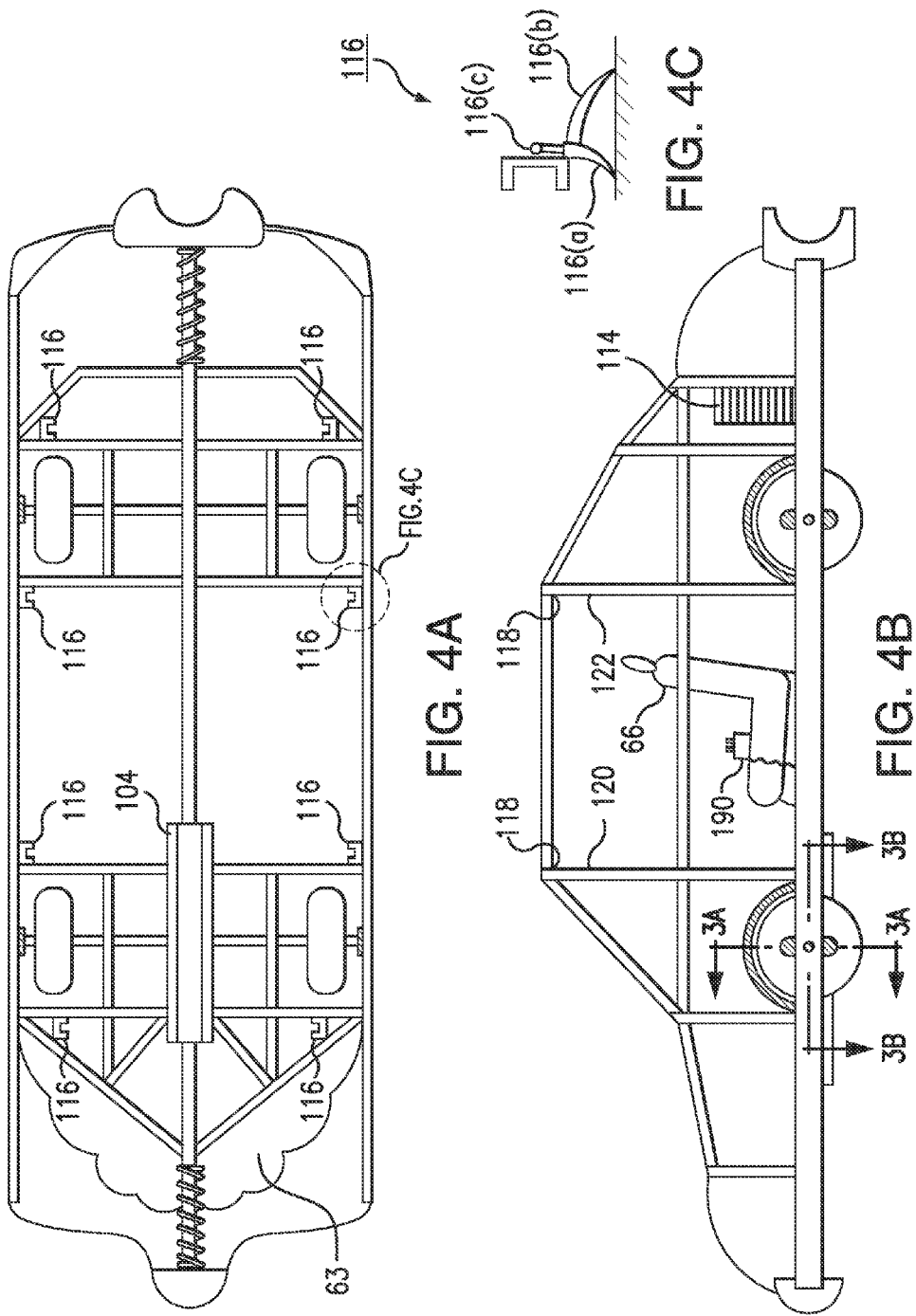

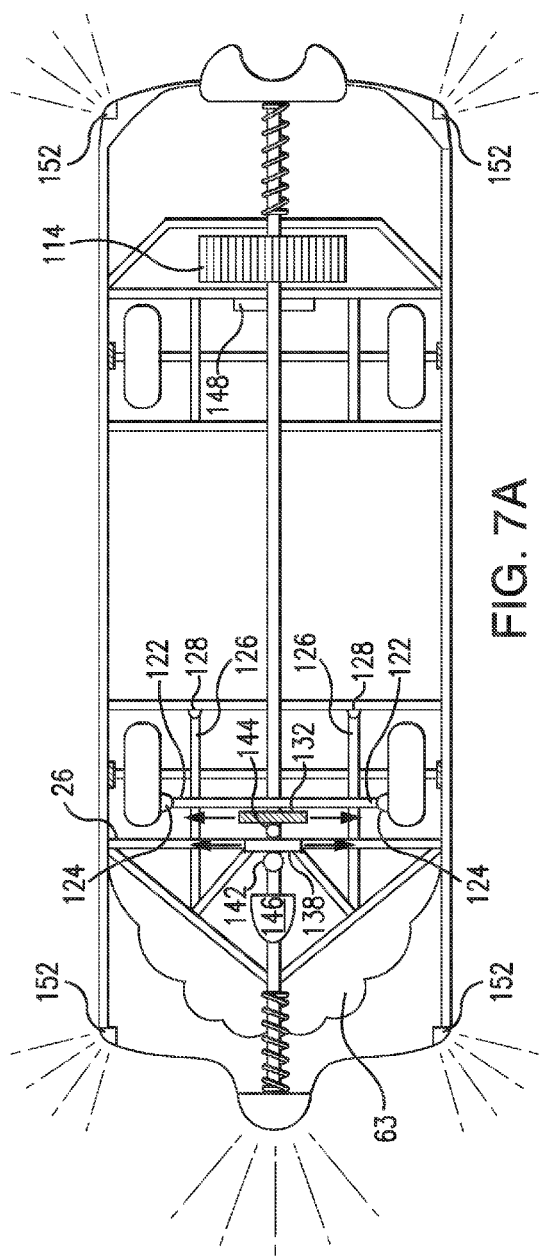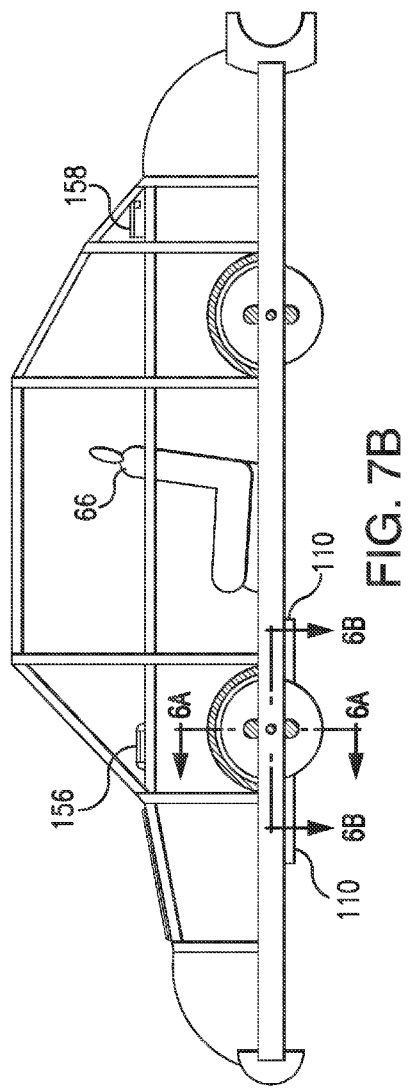
FIG. 7A
FIG. 7B

ENVIRONMENT ADAPTIVE ELECTRIC VEHICLE WITH LOCK ON SECURITY AND CONTROL SADDLE

CROSS REFERENCE TO RELATED APPLICATIONS

This application claims priority to provisional patent application Ser. No. 61/546,144 filed on Oct. 12, 2011, and entitled "Environment Adaptive Electric Vehicle with Lock On Security and Control Saddle." The contents of this application are fully incorporated herein for all purposes.

TECHNICAL FIELD

The present disclosure relates to an automotive vehicle. More particularly, the present disclosure relates to an automotive vehicle design that can be readily adapted to a variety of environments.

BACKGROUND OF THE INVENTION

The use of automotive vehicles is well known in the art. Current vehicles are designed for operation on conventional highways and require continual manual control. These conventional vehicles must be sufficiently heavy and strong to protect human occupants from accidents. These accidents can come from any direction and at any time.

Conventional vehicles also employ conventional tires with rotating axles. Most conventional vehicles also use some variation of the H chassis design. Both of these features limitation on designing a safe vehicle. It is an object of the present disclosure to improve upon the safety of conventional vehicles by eliminating the use of conventional tires and chassis designs. It is also an object of the present disclosure to provide an automotive vehicle that can be adapted to a wide variety of transportation environments.

SUMMARY OF THE INVENTION

The vehicle of the present disclosure introduces an entirely new class of transportation vehicle. The vehicle adapts to its environment much as a human adapts to its environment. The vehicle is not limited to any one environment. The kind of environment that is being referenced is any kind of surface transportation system environment. The vehicle adapts its body parts to the system it is operating in. The vehicle has a computer, multiple sensors, GPS input, odometer, acceleration/velocity measurement controls, an energy source, an internal steering mechanism, receivers and transmitters. These make up the senses, muscles, communications, nervous system, and brains of the vehicle. However, unlike in other vehicles or machines, how all these devices are used depends upon the surface transportation environment it is currently operating within.

It is an object of this disclosure to provide an electric powered vehicle that uses batteries, ultra capacitors, fuel cells or that receives electric energy direct from the guide way. It could also use any other form of energy and engine to power the vehicle.

It is also an object of this disclosure to provide an operating environment for a vehicle that is on a guide way with completely restricted access and that uses a single guiderail or security beam to route the vehicle down the center of the guide way. This provides a totally automated environment.

A further object is to provide a system with a passive guide way (has no moving parts) and that provides a two tiered (double layer) guiderail beam for vehicles to use when they want to exit the guide way to go to another guide way or an interchange or side spur.

An object of this disclosure is to design the physical anatomy of a vehicle around its environment with some additional capabilities for use in other environments.

A still further object is to provide a vehicle that can be adapted to operate as an automobile on conventional roads. The vehicle can also be adapted to operate in a local environment such as a subdivision, apartment complex community or a town center shopping mall or on an automated system that has no conventional automobiles. In such an environment roads are single lane, one way, and flat typically with no other features. This environment could have a lot of variables and could require a variety of adaptations as subdivision, apartments and commercial developments could have considerable variability.

It is also an object of this disclosure to provide a vehicle chassis with a strong backbone or center beam. This permits all vehicles in the system to be aligned over the security beam so in the event of an accident all the vehicles line up along a central axis.

The present disclosure also provides vehicles with bumpers that allow for a wide degree of compression.

These and other objects are achieved by providing a vehicle that is preferably powered with in-wheel motors and that are mounted on non rotating axles. A solid continuous skirt beam protects the perimeter of the vehicle. The vehicle can be an ultra-light vehicle that will sometimes be operating on conventional roads. On-board sensors and controls will adapt to help keep the vehicle safer from accidents, but in the event of a broadside (T-Bone, the most fatal kind of accident and the most common) accident at intersections the vehicle has a tripping device to help neutralize the momentum advantage of the other vehicle due to weight advantage. If the other vehicle is moving fast enough the vehicle will roll and slide rather than take the impact from the most vulnerable situation. The vehicle doors are gull wing and open automatically. This avoids the head room problem and difficulty getting in and out of a smaller vehicle. The doors operate from the center of the vehicle. This allows the extra headroom.

Various embodiments of the invention may have none, some, or all of these advantages. Other technical advantages of the present invention will be readily apparent to one skilled in the art.

BRIEF DESCRIPTION OF THE SEVERAL VIEWS OF THE DRAWING

For a more complete understanding of the present disclosure and its advantages, reference is now made to the following descriptions, taken in conjunction with the accompanying drawings, in which:

FIG. 4A is a top plan view of the vehicle of the present disclosure.

FIG. 4B is a side elevational view of the vehicle of the present disclosure.

FIG. 4C is a detailed view taken from FIG. 4A.

FIG. 7A is a top plan view of the vehicle of the present disclosure.

FIG. 7B is a is a side elevational view of the vehicle of the present disclosure.

Similar reference numerals identify similar parts throughout the several views of the drawings.

Figure 1A:
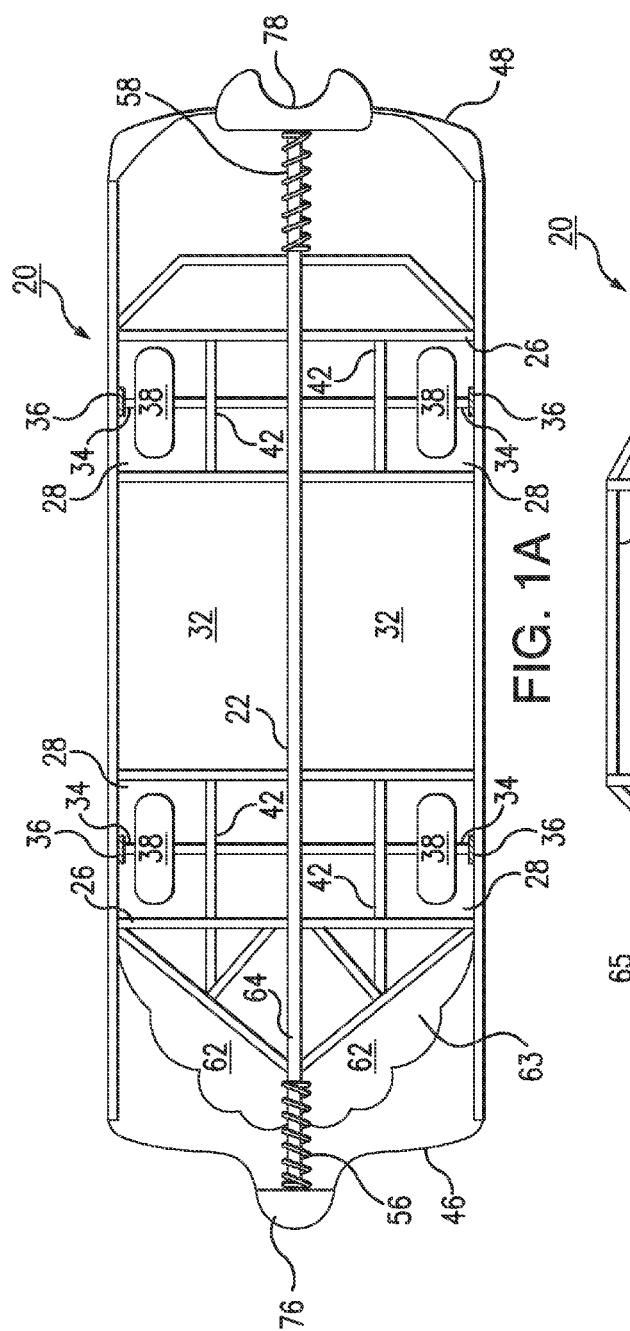
FIG. 1A is a top plan view of the vehicle of the present disclosure.
Figure 1B:
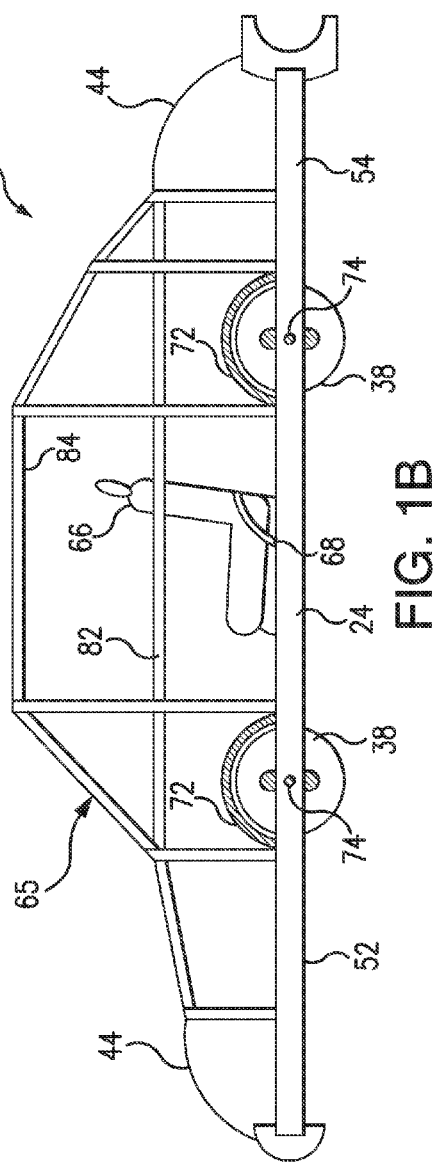
FIG. 1B is a is a side elevational view of the vehicle of the present disclosure.
Figure 2:
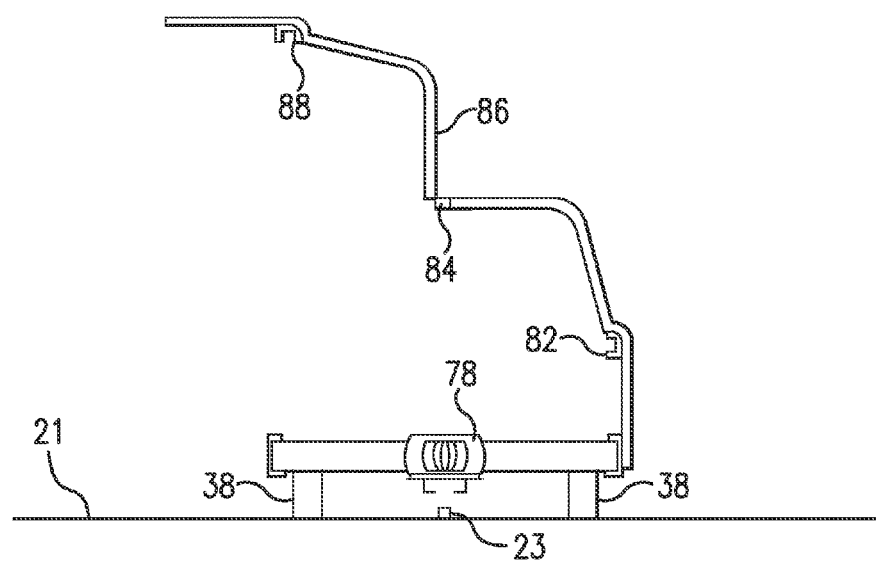
FIG. 2 is a rear elevational view of the vehicle of the present disclosure.
Figure 3A:
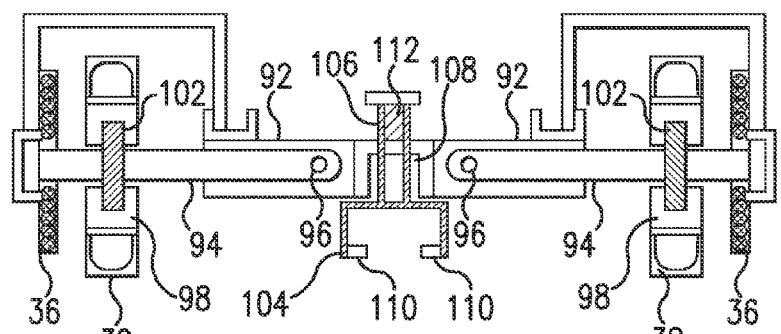
FIG. 3A is a sectional view taken along line 3A-3A of FIG. 4B
Figure 3B:
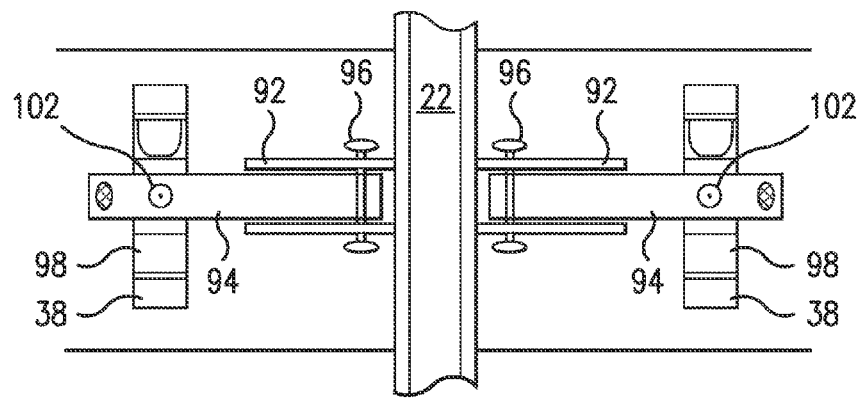
FIG. 3B is a sectional view taken along line 3B-3B of FIG. 4B.

| Parts List | |
|---|---|
| 20 | System |
| 21 | Guide Way |
| 22 | Chassis (center beam) |
| 23 | Security Beam |
| 24 | Skirt Beam |
| 26 | Body Side Brace |
| 28 | Wheel Well Space |
| 32 | Floor Deck |
| 34 | Axle Assembly |
| 36 | Shock Absorber |
| 38 | Wheel |
| 42 | Wheel Well Strut |
| 44 | Skin of Compression Bumper |
| 46 | Front Bumper Assy |
| 48 | Rear Bumper Assy |
| 52 | Side Bumper Assy (front) |
| 54 | Side Bumper Assy (rear) |
| 56 | Front Shock Absorber |
| 58 | Rear Shock Absorber |
| 62 | Front Air Bag Storage |
| 63 | Airbags |
| 64 | Front of Frame |
| 65 | Continuous Structural Frame |
| 66 | Passenger Seat |
| 68 | Seat Shock Absorbers |
| 72 | Wheel Well |
| 74 | Tire Lock Pin |
| 76 | Tip of Vehicle and Bumper Nose |
| 78 | Rear Vehicle Bumper Socket |
| 82 | Shoulder Height Skirt Beam |
| 84 | Center Head Beam |
| 86 | Gull Wing Door |
| 88 | Door Mounted Skirt Beam |
| 92 | Axle Pocket |
| 94 | Axle Arm and Wheel Mount |
| 96 | Axle Mounting Pin |
| 98 | In-Wheel Motor |
| 102 | Steering Pin |
| 104 | Saddle |
| 106 | Saddle Piston |
| 108 | Piston Bearings |
| 110 | Saddle Sensors |
| 112 | Solenoid |
| 114 | Batteries (Ultra Capacitors) |
| 116 | Crash Guard |
| 118 | Roll Guard |
| 120 | Front Roll Bar |
| 122 | Steering Rod |
| 124 | Wheel Bracket |
| 126 | Steering Yoke |
| 128 | Steering Yoke Hinge Bracket |
| 132 | Precision Steering Worm Gear |
| 134 | Precision Steering Worm Mounting Rod |
| 136 | Hinge Bracket for Fine Steering Arm |
| 138 | Corrective Steering Cog |
| 142 | Correction Steering Cog |

-continued

| Parts List | |
|---|---|
| 144 | Precision Screw Gear and Motor |
| 146 | Computer/Receiver/Transmitter/GPS |
| 148 | DVR |
| 152 | Bumper Sensors |
| 156 | Cameras |
| 158 | Camera (rear) |
| 162 | Screw Gear and Motor |
| 166 | Legrest |
| 168 | Seat Cushion Rotator |
| 172 | Seat Cushion |
| 174 | Back Support Rotator |
| 176 | Back Support |
| 178 | Vehicle Handicap Platform |
| 182 | Seat Controls |
| 184 | Seat Belt |
| 186 | Chest Belt |
| 188 | Arm Rest |
| 190 | Joystick |

DETAILED DESCRIPTION OF THE INVENTION

The foundation or backbone of the vehicle 20 is the chassis or center beam 22. Center beam 22 runs from the tip of the vehicle 20 to the back excluding the compressible bumpers. Beam 22 can be any shape, an I-beam, a square tube, a circle, triangle or U channel. In these figures center beam 22 is a U channel placed upside down. On the guide way the only likely accident would involve vehicle 20 running into a fixed object or into the back of another vehicle. Beam 22 is strong enough that it will not collapse at any impact speed. There is a front bumper assembly 46 and rear bumper assembly 48. In the preferred embodiment, each bumper assembly (46 and 48) allows up to two feet of movement during a collision. Every vehicle 20 has the same hard rubber bumper nose 76 that lines up with and fits into the bumper socket 78 at the rear of vehicle 20.

A skirt beam 24 surrounds the entire vehicle floor and base perimeter in the same plane as the chassis. Skirt beam 24 is a continuous solid rim. Body side braces 26 provide support and bracing from the skirt 24 to the center beam 22. Brace 26 stops at center beam 22 because that is what Brace 26 is being braced off of. A wheel well strut 42 completes the wheel well space 28. Vehicle 20 has air bags 63 stored in front air bag storage area 62. If vehicle 20 has a minor collision (such as a 20 MPH impact, or a force that moves the front bumper 46 in maybe 6 inches) the bumper 46 springs back out via front shock absorber 56 and no airbag has released. In the event of a higher impact collision air bags 63 are activated and inflate. The harder the impact, the more the air bags 63 are compressed and the faster and stronger they will deploy.

The axle assembly 34 is comprised of an axle pocket 92 attached to the center beam 22 on one end and the wheel well strut 42 on the other end. Axle arm and wheel mount 94 support the wheel assembly 38. One end is pinned into the axle pocket 92, with axle mounting pin 96. The axle arm 94 can swivel down around pin 96. The other end of the axle arm 94 is mounted in a shock absorber 36 Shock absorber 36 is mounted to the skirt beam 24. Axle arm 94 preferably does not rotate.

Wheel assembly 38 comprises an in-wheel motor 98 that fits on over axle arm 94 and is secured in place and is able to pivot in a horizontal plane around the steering pin 102 The wheel 38 rotates around an in-wheel motor hub.

Figure 6A:
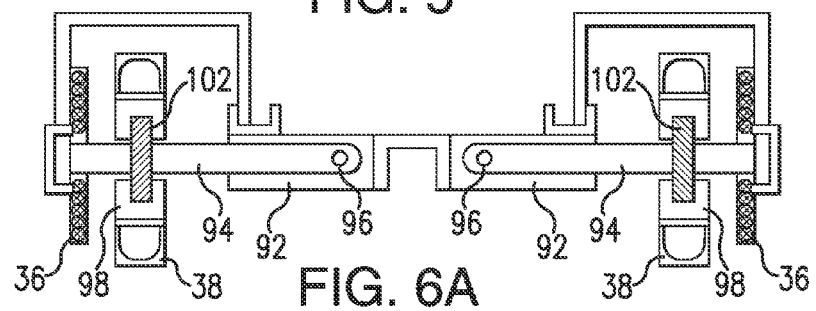
FIG. 6A is a sectional view taken along line 6A-6A of FIG. 7B.
Figure 6B:
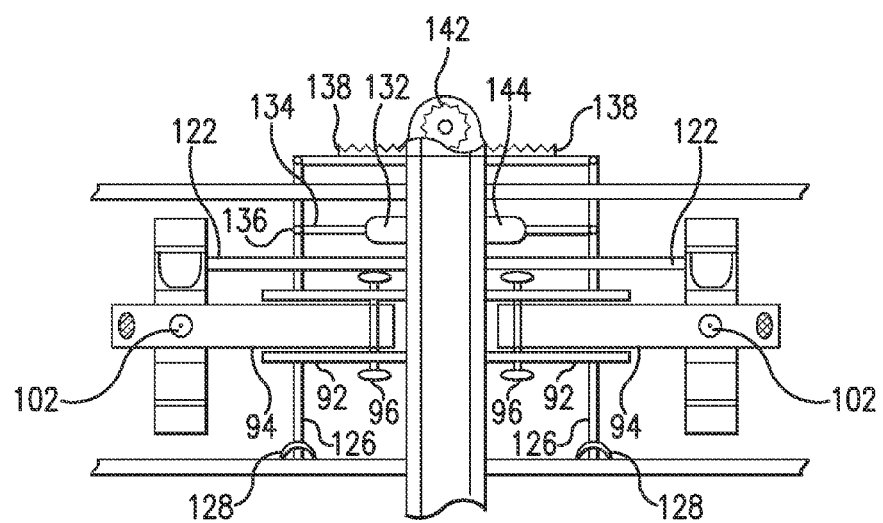
FIG. 6B is a sectional view taken along line 6B-6B of FIG. 7b.

One embodiment of the vehicle steering mechanism is shown in FIGS. 6 and 7. As illustrated, a steering rod 122 is connected on each end to a steering rod wheel bracket 124 which is attached to the inside surface of the in-wheel motor 98. Steering rod 122 has a precision steering worm gear 132 in its center. A screw gear and motor 144 rotates against the worm gear 132 to move the steering rod 122 either direction to move the front wheels 38 based on instructions from the computer 146 which receives electronic input from saddle sensors 110 when vehicle 20 is operating on the guide way.

Screw gear and motor 144 are mounted on the precision steering worm mounting rod 134 which is attached by the hinge bracket for fine steering worm 136 to the steering yolk 126. Steering yolk 126 is made up of three rods connected on their ends with steering yolk hinge brackets 128. The center rod of the steering yolk 126 supports a corrective steering cog 138. Cog 138 can be moved quickly in either direction by the corrective steering cog gear and motor 142 based on instructions from the computer 146 which receives electronic input from saddle sensors 110 if vehicle 20 is operating on a guide way. In normal driving conditions the rods of the steering yolk 126 would be all squared up. Precision steering worm gear 132 would be centered up and the front wheels 38 would be perfectly lined up for straight ahead movement. As vehicle saddle 104 tracked the direction of the guide way guide beam it would send electronic data to computer 146 which would operate the precision screw gear and motor 144. This operates vehicle 20 smoothly. In the event something requires rapid adjustment such as vehicle 20 losing traction due to something slippery on the guide way then the first precision steering assembly is disengaged and the second corrective steering cog gear and motor 142 are activated. This dual-mechanism configuration allows vehicle 20 to make steering corrections more rapidly.

If vehicle 20 is operating on a conventional street and bumper sensors 152 can detect an approaching vehicle on a collision path. If this occurs, then the corrective steering cog gear and motor 142 may be activated along with acceleration of the in-wheel motors 38 so as to avoid collision or move the impact away from vehicle occupants.

Continuing now with the vehicle descriptions. The reason the axle assembly 34 is fastened on its ends into the skirt beam 24 without a disruption is for maintaining the integrity of skirt beam 24. Another objective is to support the axle arm 94 on both sides of vehicle 20. In current vehicles 20 the wheels are mounted on the very end of a rotating axle. There is no support for the axle at the end. This places more bending moment on the axle. By placing skirt beam 24 on one end and the axle pocket 92 on the other, wheel 38 is supported on both ends of the axle arm 94. Wheel well 72 provides adequate clearance for the wheels 38 to turn in either direction. If vehicle 20 is a heavier vehicle, such as a mass transit vehicle or a heavy freight vehicle, then this support of the end of the axle with the skirt beam 24 could make a big difference and allow the vehicle 20 to be much lighter. The in-wheel motor 38 rotates about the axle arm 94.

For further protection of vehicle occupants a shoulder height skirt beam 82 creates a cage at the upper level of a person's body and head. It is interrupted by the gull wing door 86 but is reinforced by a door mounted shoulder height skirt beam 88. The gull wing door 86 is hinged from the center head beam 84. The figures illustrate how the vehicle can have a lot of head room for getting in and out of vehicle 20. Vehicle 20 would automatically open and close the doors. The vehicle occupant doesn't have to touch a thing. The center head beam 84 is another significant structural frame member. Additional protection is provided by front roll guard (or bar) 120 and rear roll guard (or bar) 122. Together the chassis center beam 22, skirt beam 24, axle assembly (92, 94, 96, and 36), body side braces 26, shoulder height skirt beam 82, center head beam 84 and roll bars (120 and 122) provide occupant protection and can create a faraday cage effect to protect against lightning.

The bottom or floor of vehicle 20 is a floor deck 32 that fills in between all these horizontal chassis and axle structures. Floor deck 32 must provide thermal insulation, road noise insulation, and especially electromagnetic field and electric radiation insulation. The transfer of electric through the saddle 104 into capacitors 114 will create strong fields beneath vehicle 20. Saddle 104 will provide a significant shield. Floor deck 32 also serves as a reinforcement plate to stiffen skirt beam 24. Floor deck 32 will be made of layers of honeycomb structures filled with urethane and diaelectric compounds. Wheel well 72 covers the upper half of the tire to complete the sound, thermal, field and radiation protective insulation.

A single passenger seat 66 is also shown, but there could be any number of passengers. Passenger seat 66 rests on shock absorbers 68 that further isolate the occupant from roadway bumps or potholes.

On the guide way vehicle 20 is guided by the saddle 104. Saddle 104 is supported by a saddle piston 106 that is moved down for switching purposes by a solenoid 112 sliding in piston bearings 108. The saddle 104 sees the guide way beam with sensors 110.

Figure 8:
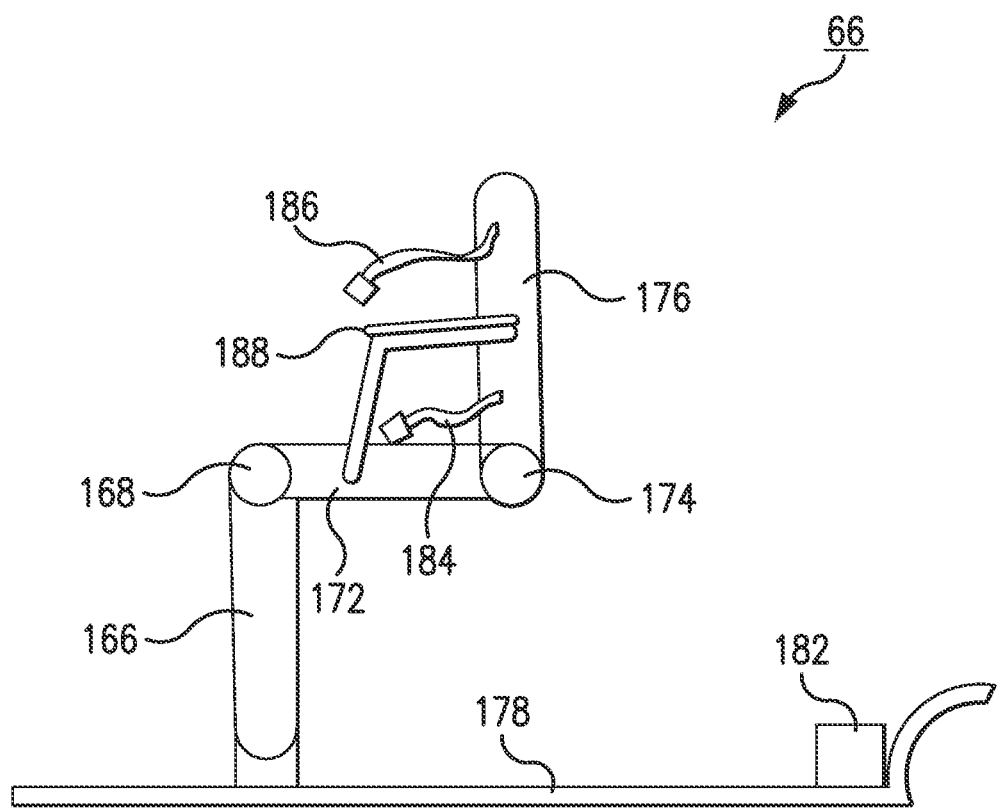
FIG. 8 is a detailed view of the seat of the present disclosure.

FIG. 8 illustrates a stand up/sit down handicap assist seat to help passengers who have weak knee muscles, back problems, shoulder, arm joint or muscle problems who have difficulty maneuvering into and out of a vehicle or any kind of chair. Passengers who need access and egress assistance is not limited to older people or to people in wheel chairs. There are many people who have old injuries or have various joint problems and arthritis. Some people are overweight. Some have weak knees. In FIG. 8 the stand up/sit down handicap assist seat is fastened to the vehicle handicap platform 178. Vehicle 20 has appropriate mechanical levers and mechanisms for lifting platform 178 slowly and safely into and out of vehicle 20. When vehicle 20 arrives at a destination, the gull wing doors 86 open, platform 178 slides out of vehicle 20 and flat on the outside landing surface. Upon command the seat cushion rotator 168 rotates the seat cushion 172 forward around the rotator 168. Seat cushion rotator 168 itself is moved up by the leg rest 166 so as the passenger stands up the leg room is being increased. Simultaneously, as the seat cushion rotator 168 rotates forward, the back support rotator 174 is rotating backward. As such, the back support 176 remains upright and vertical. When the passenger is standing steady the waist seat belt 184 and chest strap 186 can be released. Chest strap (or belt) 186 keeps the passenger from pulling forward. The passenger controls the seat with controls built into a armrest 188.

When a passenger wants to get into a vehicle the process is reversed. Obviously, passengers must request a vehicle equipped with the stand up/sit down handicap assist seat. For a passenger to use the seat it is outside the vehicle and standing extended upright. The passenger stands with their back to the chair 66. Thereafter, they fasten the seat and chest belts (184 and 186). Seat cushion rotator 168 rotates back while the back support rotator 174 rotates forward. Finally the passenger adjusts the leg support 166 up or down to get comfortable leg room.

When vehicle 20 is being driven on conventional streets it will be vulnerable to collisions that can not occur on an elevated guideway. The most frequent and fatal type of collision is caused at intersections when vehicles might run a light and hit another vehicle broadside. Since vehicle 20 is likely to be a lightweight vehicle, this kind of collision could be much worse than in traditional automobiles. In order to give the vehicle 20 some resistance and to equalize the momentum it is equipped with crash guards. FIG. 4A shows four crash guards 116 on the right sides of the vehicle and mounted on or near the perimeter skirt beam 24 When vehicle 20 is not in motion these would be locked in a resting position to avoid accidental release. If the traveling vehicle is struck on the driver side by another vehicle, all eight crash guards 116 are released with great force. FIG. 4C is a detailed view of a crash guard 116. The crash guards 116 have sharp prongs (116(a)-(b)) that dig into the asphalt. Prong 116(a) is nearest the outer edge of vehicle 20 and 116(b) prong is toward the inside. They rotate about a hinge bracket 116(c). As the EAEV is pushed sideways by a colliding vehicle the crash guards are released and offer resistance.

Figure 5:
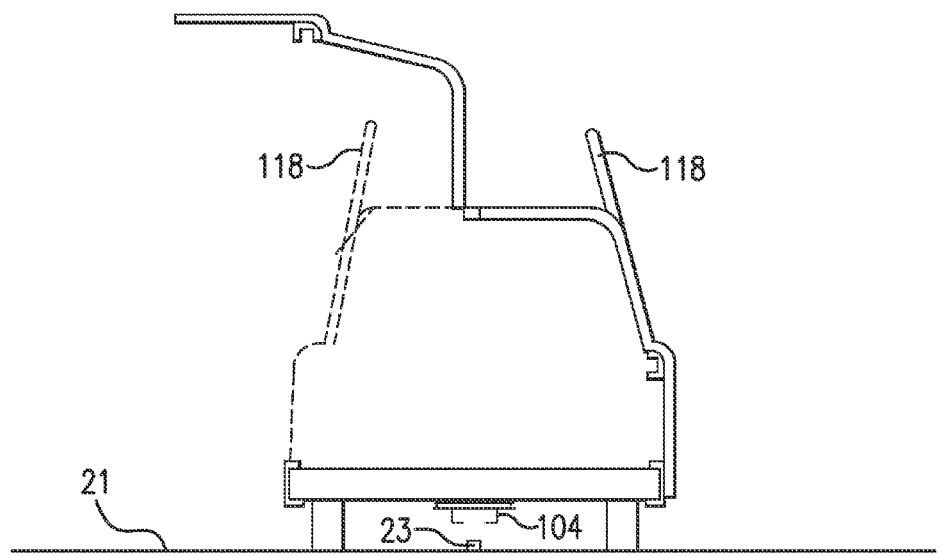
FIG. 5 is a front elevational view of the vehicle of the present disclosure.

This creates the effect of a much heavier vehicle. If the colliding vehicle strikes on the driver side and is going fast enough then the crash guards 116 on the passenger side dig in on prong 116(b) and on the driver side they dig in on prong 116(a). This causes the driver side to lift and flip the vehicle into a roll. This is the preferred result. Instead of vehicle 20 and the left side of the driver's head having to absorb the momentum of the other vehicle on the side window the energy is converted into lifting vehicle 20 and rolling it over. The goal is to absorb the energy over a longer distance. In FIG. 5 a roll guard 118 is shown. If it is preferred the vehicle roll over on its side and slide then that is what the roll guard 118 does. When the crash guards 116 are deployed the roll guard 118 pops up to stop the vehicle 20 on its side. The second object is to change the angle of attack of the impact on the vehicle occupants. If vehicle 20 is turned on its side and the occupants are strapped in their seats the impact is coming from the bottom of the seat and not from the side of the head. This situation is not ideal, but could be effective enough to save some lives in many accidents.

These are all physical characteristics. What kind of controls does the vehicle have? How does a customer communicate with and operate the vehicle? Vehicle customers will come in contact with many vehicle variations, different instrument panels, different looking gauges and controls, different sizes, and different types. It could be very confusing to someone who does not own their own vehicle. First of all, the vehicle 20 would have few instruments if any at all. There may be a touch screen, a panic button, emergency button, and a joystick 190 (FIG. 4B). There is no need for controls. The customer communicates with vehicle 20 through the system master scheduling operation center. Before a customer can use the system they must open an account for billing, identification, and to receive system software onto any personal device they will be using when they travel whether cellphone, ipod, palm pilot, blackberry, lap top or whatever. The customer is known only by the communication device. The actual name of the traveler does not matter, this protects privacy. The customer may text or the customer may use verbal communication. For verbal communication the customer uses voice recognition software on their own phone or equipment and NOT voice recognition software at a call center of the master scheduling operations center. This way it does not matter what language is used or how heavy an accent may be. The communications are simple. Text or say the destination and desired arrival time. The system comes back with questions such as how do you wish to travel and provides choices. The customer may ask for a cost and travel time estimate. The customer does not need to know anything about the vehicle. The operations center knows all about the vehicle and can explain anything the customer needs to know to travel in that vehicle.

The EAEV is an environmentally adaptive vehicle. This means a single physical embodiment equipped with some basic equipment for receiving and sending data from devices such as: GPS receiver and transmitter, sensors, video cameras, radar, wireless receiver, transmitter, odometer, equipped with some sort of information processing; a computer, and basic control output devices; steering, throttle and braking can use that same input, process it or interpret it in different ways and provide different output to controls based upon the kind of surface transportation infrastructure it is on.

When vehicle 20 is on an elevated guideway infrastructure it sets its speed at 120 mph. When it gets off on a public street with manually powered cars vehicle 20 monitors its speed according to speed limits provided by the GPS. When vehicle 20 gets off of the guideway into a single family subdivision it sets its speed at 10, 12, 15, or 17 mph just depending on what it is told by the local wireless information. Observe that in all three instances the velocity information originates from the same device, but the information is applied differently depending on the system it is on. On the elevated guideway vehicle 20 receives directional information from sensors 110 in the saddle 104. On a highway with manually operated vehicles, vehicle 20 receives directional control from a joystick 190 operated by a vehicle occupant. On a local single family paved street perhaps only six feet wide vehicle 20 receives its directional control from GPS input or instructions from land based devices. In this instance the instructional message is received from three different sources, but execution on the information is performed by the same steering device. There is another way the vehicle 20 could be controlled in a single family residential subdivision which is by memorizing the plat or road layout. As a vehicle exited the elevated guideway into a subdivision a device at the entrance could transmit all the local subdivision information. That information could come from a scheduling operations center just as well. Vehicle 20 is notified whenever it moves onto a different surface transportation infrastructure and makes the appropriate adjustments.

The scheduling operations control center is also gate keeper. Let's say someone gives an address into an exclusive community. Unless the gate keeper has authorization for that vehicle to enter that community it will not allow the access. The Gatekeeper also decides access based on the type of vehicle, the width, or height of the vehicle. In a Town Center Shopping Mall the freight delivery guideways are restricted to use by delivery vehicles and no private vehicles would be allowed. There is no need for a physical gate. Weight restrictions are also enforced by the gatekeeper. An overweight vehicle will not be allowed to move onto the system.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. An electrically powered crash resistant vehicle that is operable upon either a conventional roadway or an automated guide way, the vehicle comprising:
   a vehicle center beam extending between front and rear bumper assemblies, a front shock absorber and a series of air bags positioned within a front end of the vehicle, a rear shock absorber positioned within a rear end of the vehicle, a skirt beam surrounding a periphery of the vehicle;

forward and rearward axle assemblies, each axle assembly including an axle pocket into which an axle arm is mounted, a series of wheels rotatably mounted to each of the axle arms, each wheel being powered by an in-wheel motor, whereby each of the wheels is individually powered;

a saddle positioned upon an underside of the vehicle, the saddle being mounted to a saddle piston for raising the saddle up or down, a saddle sensor, whereby the saddle is adapted to removably engage a guide way and wherein the saddle sensor detects the guide way to maneuver the vehicle;

a first steering mechanism and a second steering mechanism, the first steering mechanism including associated gears and motors to effect first steering movements, the second steering mechanism including associated gears and motors to effect second steering movements.

2. A crash resistant vehicle that is operable upon either a conventional roadway or an automated guide way, the vehicle comprising:

a vehicle center beam extending between front and rear bumper assemblies;

forward and rearward axle assemblies, each axle assembly supporting an individually powered wheel; and a saddle positioned upon an underside of the vehicle, the saddle being mounted to a saddle piston for raising the saddle up or down, a saddle sensor, whereby the saddle is adapted to removably engage a guide way and wherein the saddle sensor detects the guide way to maneuver the vehicle.

3. The vehicle as described in claim 2 further comprising a front shock absorber and a series of air bags positioned within a front end of the vehicle, a rear shock absorber positioned within a rear end of the vehicle, a skirt beam surrounding a periphery of the vehicle.

4. The vehicle as described in claim 2 wherein each axle assembly includes an axle pocket into which an axle arm is mounted.

5. The vehicle as described in claim 2 further comprising a first steering mechanism, the first steering mechanism including associated gears and motors to effect first steering movements in the vehicle.

6. The vehicle as described in claim 2 further comprising a second steering mechanism, the second steering mechanism including associated gears and motors to effect second steering movements.

7. The vehicle as described in claim 2 wherein the center beam is placed at a specified distance above a roadway surface, and wherein the center beam will line up with all other similar vehicles.

8. The vehicle as described in claim 2 further comprising a curved plastic bumper nose at a front of the center beam and a curved plastic bumper nose at a rear of the center beam.

9. The vehicle as described in claim 2 wherein the saddle wraps around a security beam to prevent the vehicle from being knocked off of the security beam.

10. The vehicle as described in claim 2 further comprising a collapsible bumper area for storing a series of airbags such that the harder an impact the greater will be a pressure on the series of air bags as they deploy.

11. The vehicle as described in claim 2 further comprising a single continuous structural frame around an entire perimeter of the vehicle.

12. The vehicle as described in claim 2 wherein the axles do not rotate.

13. The vehicle as described in claim 2 wherein each wheel includes an associated in-wheel electric motor that rotates around a non-rotating or fixed axle.

14. The vehicle as described in claim 13 further comprising a rotating pin assembly that allows each in-wheel motor on a steering axle of the vehicle to rotate left or right in a horizontal plane and that allows the vehicle to be steered.

15. The vehicle as described in claim 2 further comprising gull wing doors that open from or near a center of a vehicle roof so that occupants have essentially unlimited head room for getting into and out of the vehicle.

16. The vehicle as described in claim 2 further comprising an insulating semi-structural floor deck held in place in a plane of a skirt beam, the center beam, and body side braces to protect vehicle occupants from electromagnetic and electrowave fields, electromagnetic radiation, thermal insulation, road noise, and to add structural impact resistance.

* * * * *